Aug. 4, 1931.   I. E. McCABE   1,817,635
CONTROL FOR ELECTRICALLY OPERATED LIQUID FUEL BURNING DEVICES
Filed Oct. 10, 1928   7 Sheets-Sheet 1
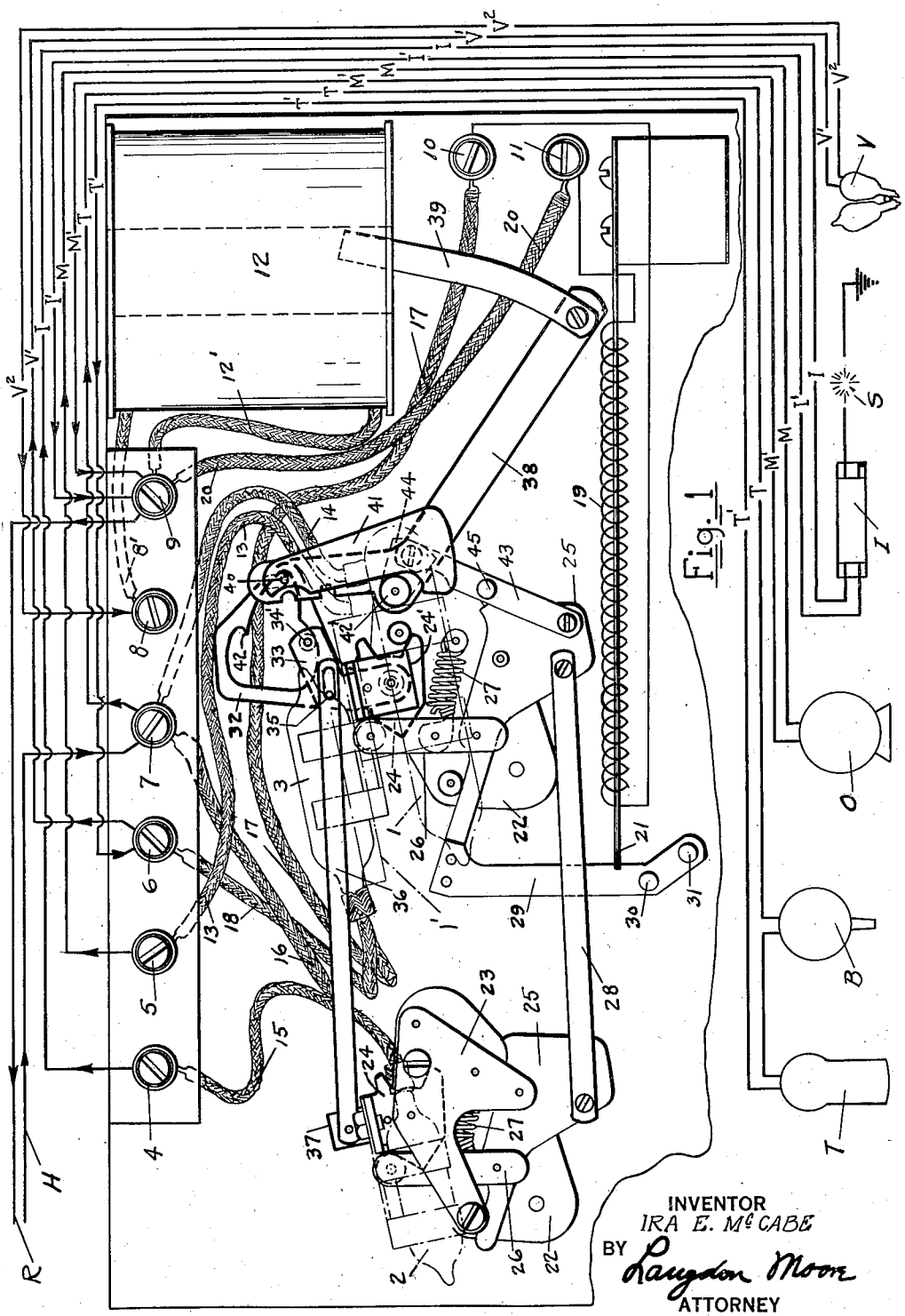
INVENTOR
IRA E. McCABE
BY Langdon Moore
ATTORNEY Aug. 4, 1931.  I. E. McCABE  1,817,635
CONTROL FOR ELECTRICALLY OPERATED LIQUID FUEL BURNING DEVICES
Filed Oct. 10, 1928  7 Sheets-Sheet 2
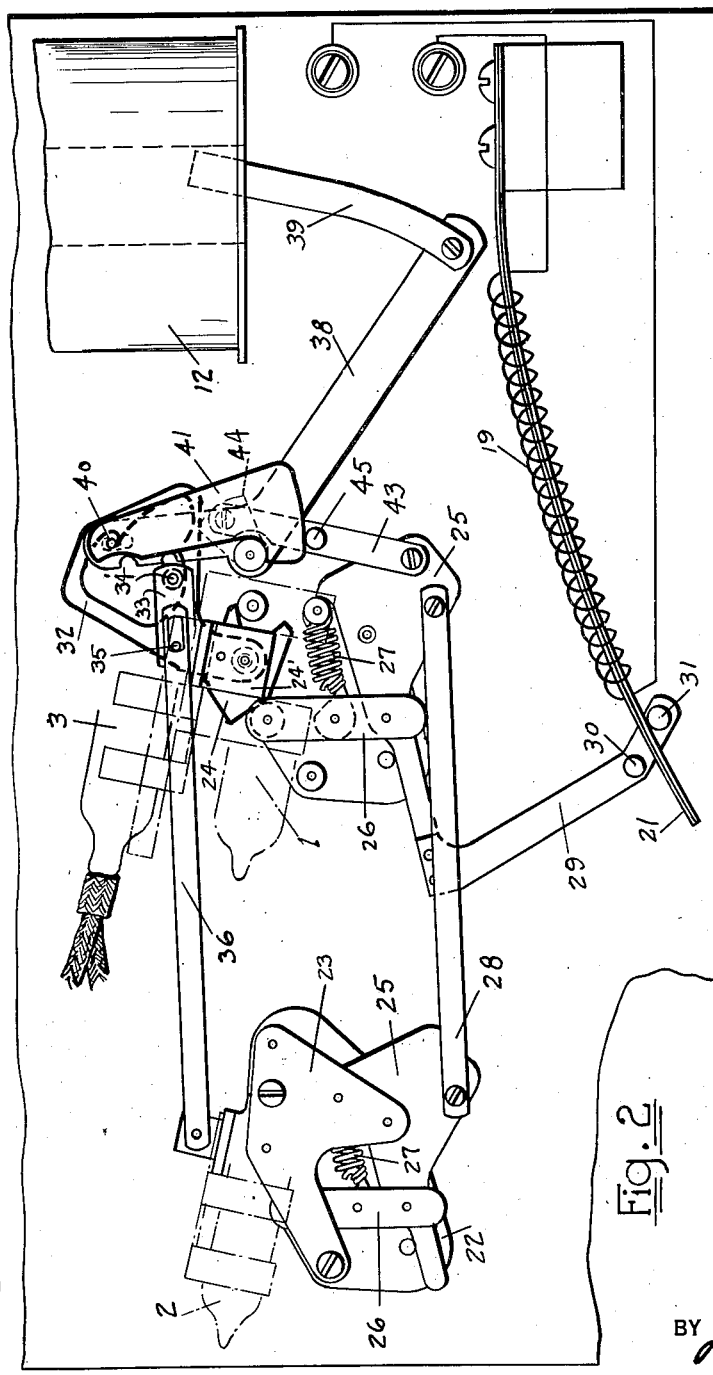
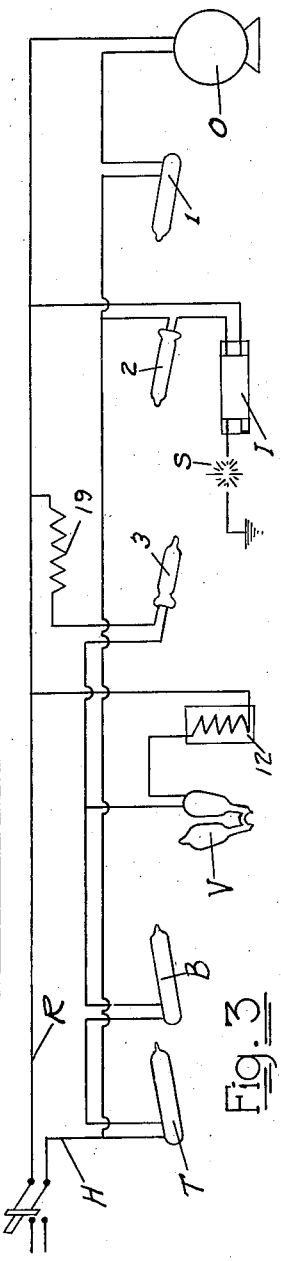
INVENTOR
IRA. E. McCABE
BY
ATTORNEY Aug. 4, 1931.  I. E. McCABE  1,817,635
CONTROL FOR ELECTRICALLY OPERATED LIQUID FUEL BURNING DEVICES
Filed Oct. 10, 1928  7 Sheets-Sheet 3
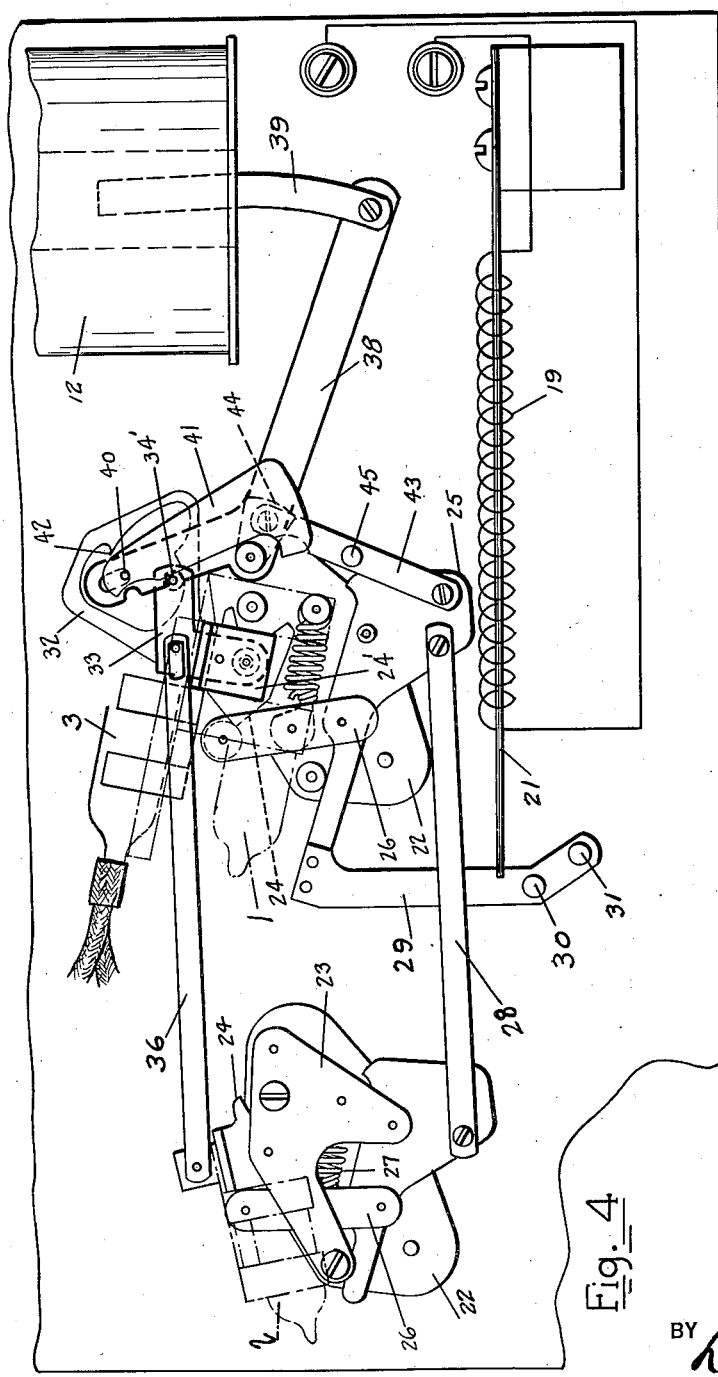
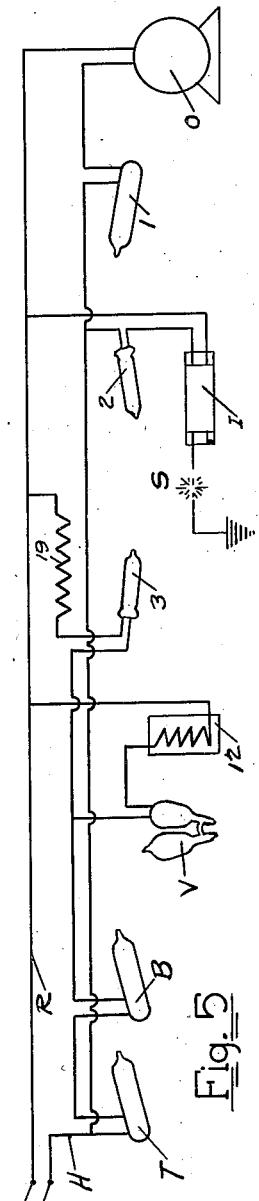
INVENTOR
IRA E. McCABE
BY
Langdon Moon
ATTORNEY Aug. 4, 1931.                    I. E. McCABE                    1,817,635
           CONTROL FOR ELECTRICALLY OPERATED LIQUID FUEL BURNING DEVICES
                       Filed Oct. 10, 1928       7 Sheets-Sheet 4
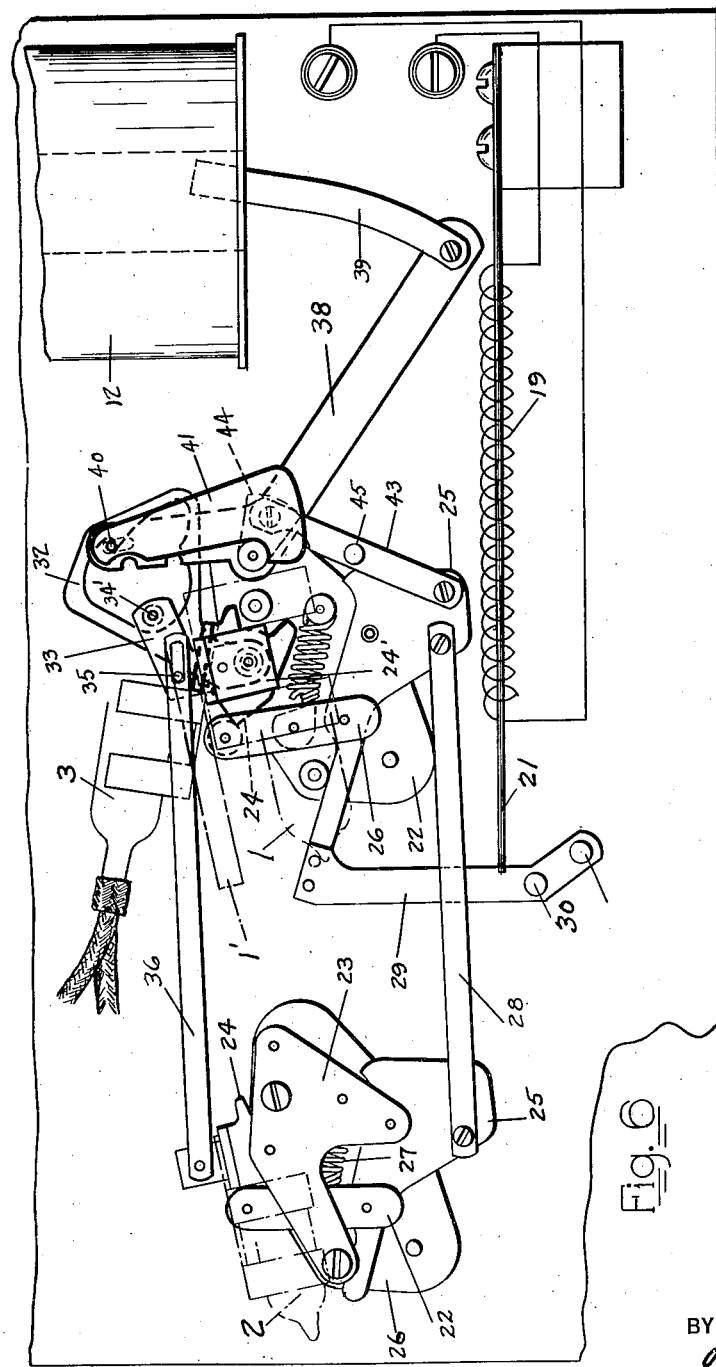
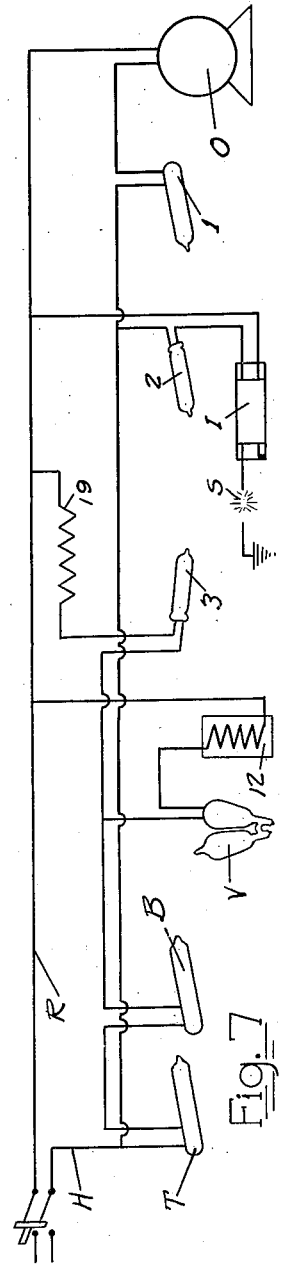
INVENTOR
IRA E. McCABE
BY
ATTORNEY Aug. 4, 1931.                I. E. McCABE                1,817,635
CONTROL FOR ELECTRICALLY OPERATED LIQUID FUEL BURNING DEVICES
                Filed Oct. 10, 1928       7 Sheets-Sheet 5
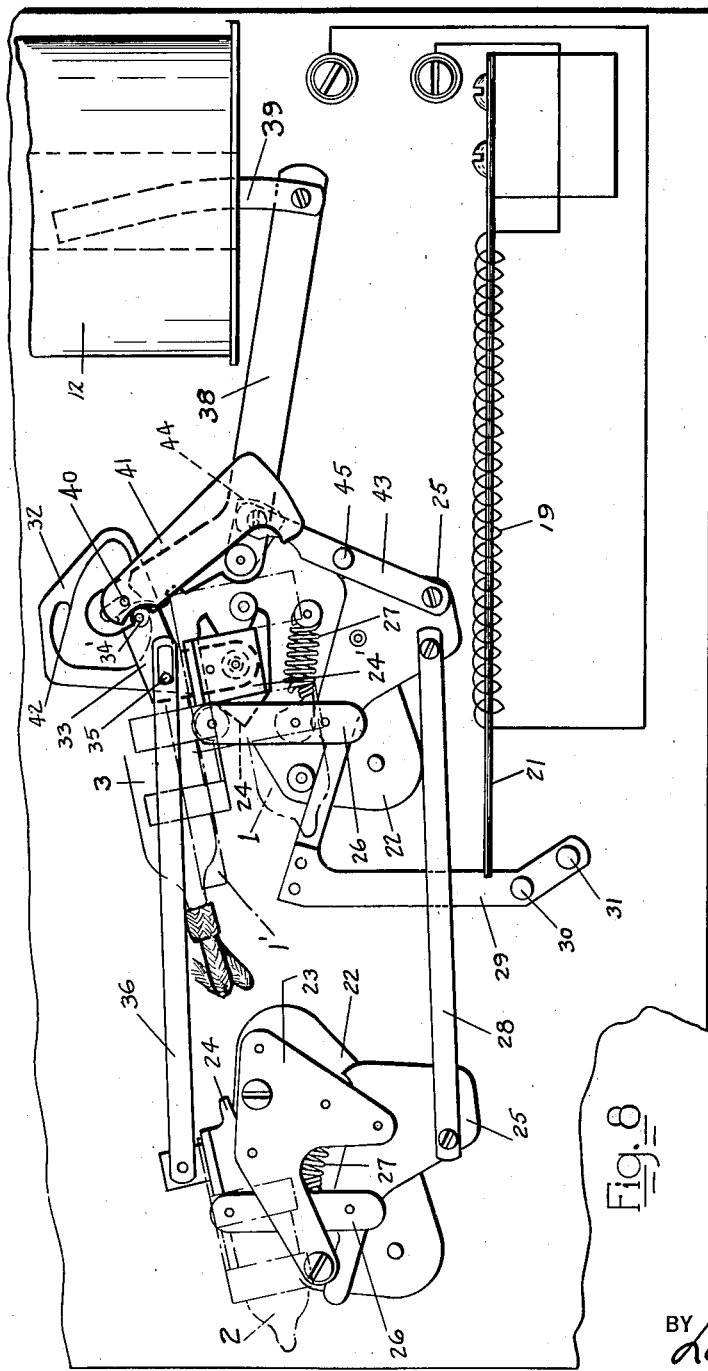
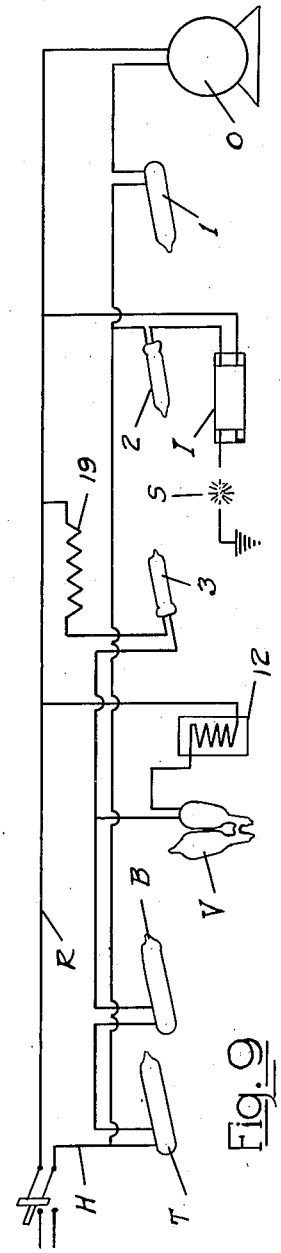
INVENTOR
IRA E. McCABE
BY Langdon Moon
ATTORNEY Aug. 4, 1931.  I. E. McCABE  1,817,635
CONTROL FOR ELECTRICALLY OPERATED LIQUID FUEL BURNING DEVICES
Filed Oct. 10, 1928  7 Sheets-Sheet 6

INVENTOR
IRA E. McCABE
BY
ATTORNEY

Aug. 4, 1931.                    I. E. McCABE                    1,817,635
          CONTROL FOR ELECTRICALLY OPERATED LIQUID FUEL BURNING DEVICES
                    Filed Oct. 10, 1928            7 Sheets-Sheet 7
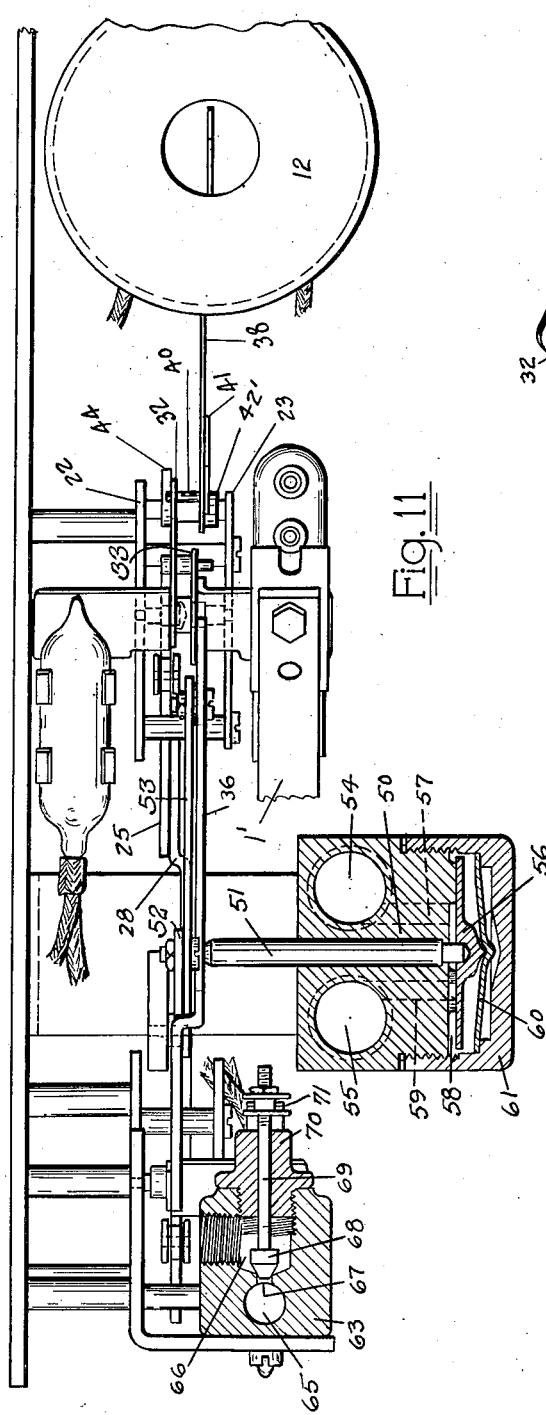
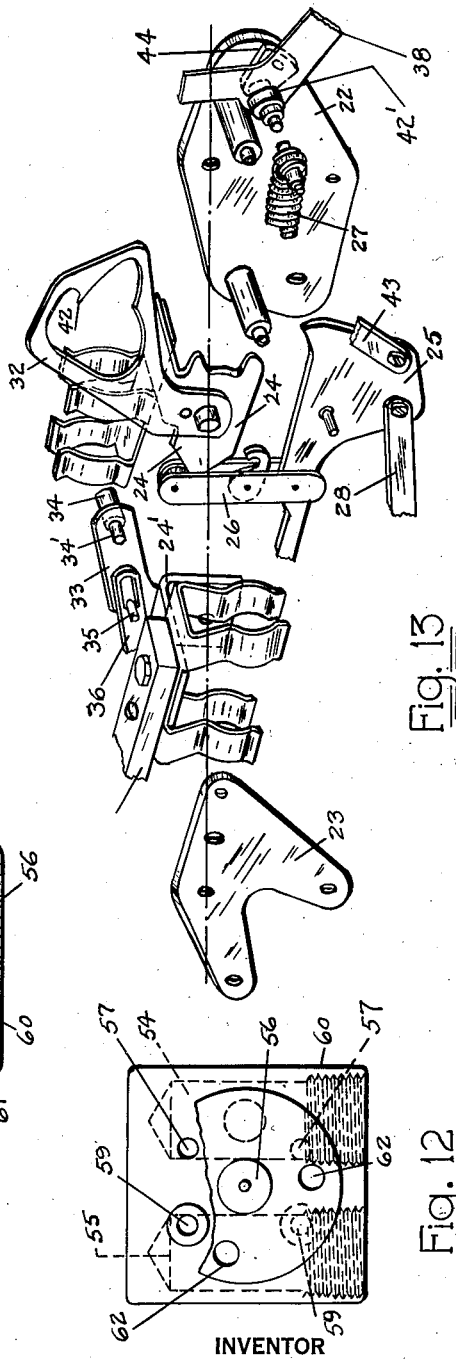
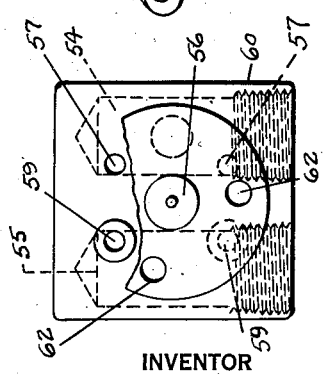
INVENTOR
IRA E. McCABE
BY
*Langdon Moon*
ATTORNEY Patented Aug. 4, 1931

1,817,635

UNITED STATES PATENT OFFICE

IRA E. McCABE, OF CHICAGO, ILLINOIS

CONTROL FOR ELECTRICALLY OPERATED LIQUID FUEL BURNING DEVICES

Application filed October 10, 1928. Serial No. 311,437.

This invention relates to improvements in controls for electrically operated liquid fuel burning devices for domestic heating purposes, usually termed oil burners.

It has been the usual practice in oil burner safety devices to have a room thermostat, a boiler or furnace limiting device and a safety device to operate in connection with the burner. Many of these safety devices are arranged to shut down the burner in the event of flame or ignition failure, these devices functioning from the temperature of the flame or from the light of the flame. While they protect the burner in the event of failure to ignite they also tend to shut down the burner if the flame fluctuates or cuts down to a point too far below the previous normal operating condition.

It is the purpose of this invention to provide a control, which will function satisfactorily as long as the control is in working order and as long as the burner is in working order; which will prevent operation of the burner in case it fails to ignite; will prevent operation of the burner in case the flame safety does not return to the off position; will prevent, in the case of momentary current interruption, resumption of operation without ignition and where the flame fluctuation has caused the shut down from the flame safety device, will thereafter restart the burner automatically after a predetermined rest period, thereby giving unconsumed vapors in the furnace a chance to pass out of the combustion chamber and flue; to permit operation of the burner and restarting until such a time as the burner shall fail to ignite.

While there have been constructions which attain nearly the performance which this control secures there are certain essential points which will be found lacking and it is the contention of the inventor that the absence of any of the features herein described will not produce entire protection in the construction of automatic burners.

It is the purpose of this invention,

First—To require that the flame safety shall have gone to the off position before the equipment can start.

Second—To start the burner and the ignition device and permit it to operate for a predetermined period which shall allow for the necessary time for ignition.

Third—To shut down the burner in case it fails to ignite.

Fourth—To permit continued operation of the burner in case ignition takes place.

Fifth—In the event of momentary interruption to prevent resumption of operation of the burner without the ignition circuit being closed.

S xth—To continue operation of the burner as long as the flame shall remain and in the event of interruption of current for any reason, to cause resumption of operation when the current is restored.

Seventh—In the event of interruption of operation caused by flame fluctuation or failure after a predetermined period, to restart normally as in previous operations unless or until ignition failure occurs.

Eighth—To permit operation by a room thermostat and a boiler control both or either one such instruments being designed to handle only the low currents needed for the operation of the device and so arranged that, if desired, low voltage control may be used.

The control which I am about to describe embodies all the features outlined above. It offers a complete automatic oil burner control which is suitable for the constant flame burner in connection with automatic ignition means.

It will be seen that my device furnishes new and unusual features in the performance which it attains.

While the apparatus requires careful analysis those experienced in the construction of automatically electrically operated fuel burning equipment will readily appreciate and understand the value of the particular requirements embodied in this device.

In the event of a momentary interruption of current it is the function of the flame safety to shut down the burner. In some cases when the current was restored before the flame safety had time to return to the off position operation was resumed before the ignition means were in action. This caused the combustion chamber to be filled with gases and as the flame safety closed the ignition circuit an explosion resulted. It will thus be seen that with the control means herein described, automatic starting is secured and the hazards encountered in previous attempts have been avoided.

While automatic control systems have been well developed and considerable data is available it is desired to point out the distinctive features which this device has to offer in order that one may be fully able to understand the improvements herein described.

While the preferred forms of this invention are illustrated upon the accompanying sheets of drawings, yet it is to be understood that minor detail changes may be made without departing from the scope thereof.

In the drawings:

Figure 1 is an enlarged detail view in front elevation of a switch panel embodying this invention, with the cover removed and parts broken away, showing the wiring in diagram from the source of electricity and its connections to the panel and respective operating parts of an electrically operated liquid fuel burner, in which the switch parts are shown in the cold position or the position assumed when the burner is idle.

Figure 2 is a view of the switch panel similar to Figure 1, with parts omitted, illustrating the position assumed when the room thermostat closes the starting circuit.

Figure 3 is a diagram of the wiring from the switch panel to the respective operative parts of the burner system, with the switches in position shown in Figure 2.

Figure 4 is a view similar to Figure 2, illustrating the positions assumed by the switch parts when the burner is continuously operating, in other words, the running position.

Figure 5 is a diagram similar to Figure 3, illustrating the running position.

Figure 6 is a view similar to Figure 2, illustrating the positions of the switch parts if ignition fails initially.

Figure 7 is a diagram similar to Figure 3, illustrating positions upon initial ignition failure.

Figure 8 is a view similar to Figure 2, illustrating positions of switch parts assumed upon a failure of the commercial supply of electric current.

Figure 9 is a diagram similar to Figure 3, illustrating the positions assumed upon cessation of current.

Figure 11 is a top plan view of Figure 10 illustrating the oil valve and gas valve both in central horizontal section.

Figure 12 is a detail view in side elevation of the oil valve with the valve cap removed.

Figure 13 is a view in perspective of parts of the actuating and operating mechanism of the motor and heat switches spaced apart in normal relation to illustrate the construction thereof.

Figure 10:
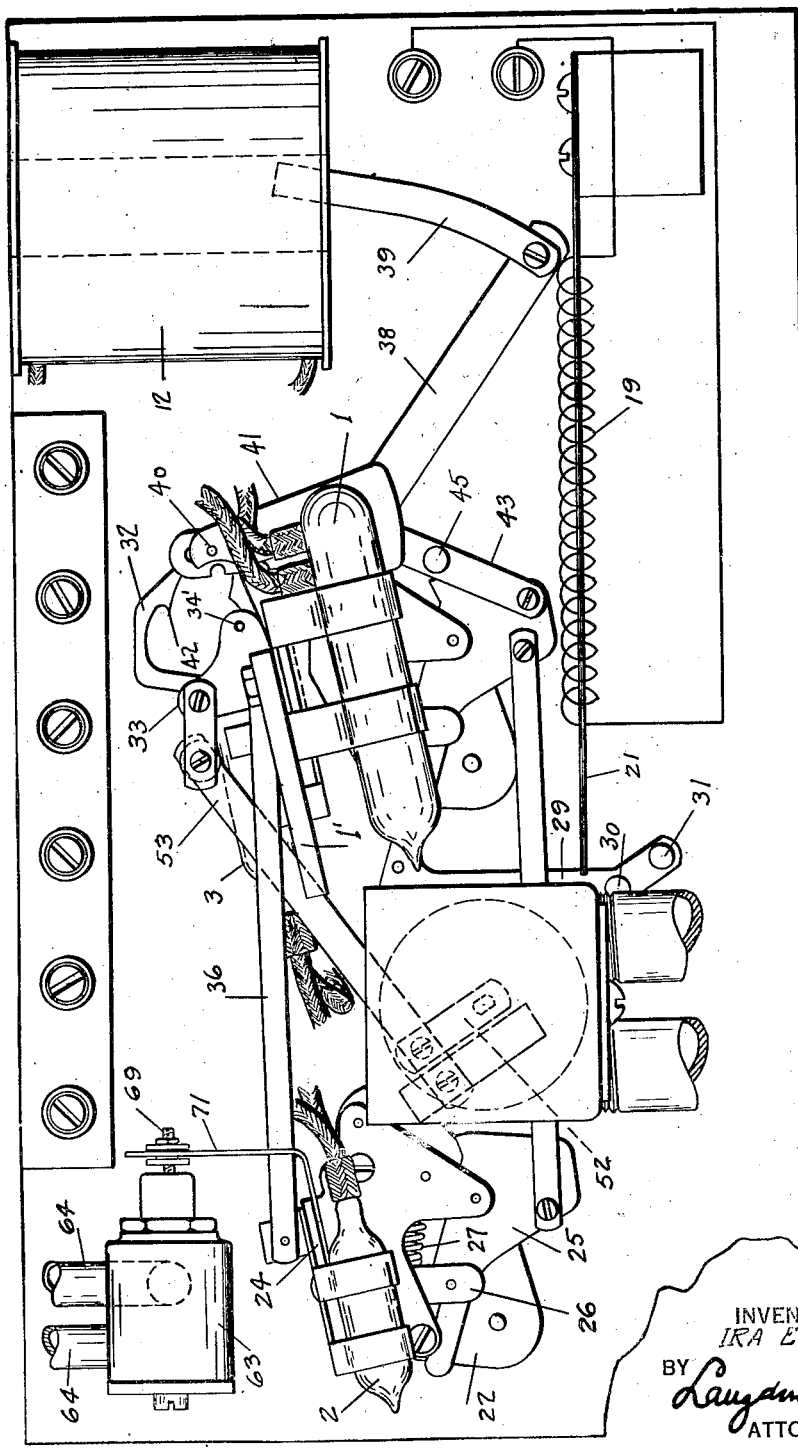
Figure 10 is a view in front elevation of a switch panel, with cover removed and wiring connection omitted, of an embodiment of this invention including, in addition to the switch mechanism, an oil valve and a gas valve operated thereby.

An embodiment of this invention is illustrated upon Figure 1 of the drawings showing the switch panel, with cover removed, and the wiring of the switches thereon to the panel binding posts and the wiring in diagram from the switch panel binding posts to the respective parts of an electrically operated liquid fuel burner system.

The switch panel pivotally mounts three electric mercury tube switches, 1, 2 and 3 and is provided with a series of binding posts, 4, 5, 6, 7, 8 and 9 adjacent the center of the top of the panel and binding posts 10 and 11 adjacent the right hand lower corner, with a solenoid 12 supported above said latter binding posts.

The mercury tube switch 1 is the motor switch and is connected by flexible leads 13 and 14 to binding posts 5 and 7 respectively. The mercury tube switch 2 is the ignition switch and is connected by flexible leads 15 and 16 to binding posts 4 and 7 respectively. The mercury tube switch 3 is the heat switch and is connected by flexible leads 17 and 18 to binding posts 10 and 6 respectively.

Switch 3 is termed the heat switch because it is in a circuit passing from binding post 10 through a heating element 19 to binding post 11 and from binding post 11 through lead 20 to binding post 9. This heating element 19 is arranged about a strip 21 of bi-metallic metal secured at one end to the panel below binding post 11 and so arranged that when energized the free end of the strip will bend slowly downward.

The mercury tube switch 2, controlling the ignition circuit, is shown at the left mounted upon a snap action mechanism, more fully described in my prior pending application Serial No. 585,698, filed September 1, 1922 which matured into Patent No. 1,734,016 on October 29, 1929, which for the past six years has been a commercial article and its structure forms no part of this invention. Briefly, this snap action mechanism comprises a base plate 22, secured to the panel at a slight distance therefrom and a spaced apart face plate 23 pivotally supporting between them a switch tube carrier 24 and an actuator 25. The switch tube carrier 24 is provided with a right angular member at the top to which a plate having clips adapted to receive and hold the mercury tube 2 is secured. The left edge of the pivoted switch tube carrier 24 is provided with equal angularly disposed surfaces meeting in an apex at the center thereof with the opposite edge provided with extensions at the top and bottom thereof adapted to straddle a pin between plates 22 and 25 and limit the rotative movement of the carrier plate. The actuator 25 is provided with a downward extension and a lateral extension to the left of its pivot, said lateral extension pivotally engaging the lower end of an operating link 26, the upper end of which mounts a roller adapted to travel over the angular surfaces of the carrier 24 and is held in engagement therewith by a spring 27. In the position shown, the actuator has been swung to the left causing the roller to travel upward and travel over the upper angular surface and snap the switch tube 2 to the off position and hold the carrier 24 with its lower right hand extension in engagement with its limiting pin. Upon movement of the actuator 25 in the opposite direction, the operating link 26 is moved in a downward direction causing the roller to travel downward over the upper angular surface of the carrier 24 until it passes the apex and immediately thereafter, the spring 27 exerting a pull upon the link, the roller engages the lower angular surface causing the carrier 24 to travel with a quick movement about its pivot until its upper limiting extension engages the limit pin, whereby the mercury tube 2 is snapped into the closed position.

The mercury tube switch 1, controlling the motor circuit, is mounted to be actuated by the operation of the snap action mechanism of switch 2 in one direction. The heat switch 3 is mounted upon a switch mechanism similar to switch 2, as shown in Figure 1 with the face plate removed, and upon which similar reference numerals designate the parts similar to those described in connection with the ignition switch 2.

The motor switch 1 is mounted upon a freely moving independent carrier 24' pivoted upon the same pivot pin as the carrier 24 of the switch 3 but between it and the face plate 23, as more clearly shown in Figure 13.

Electric mercury tube switches, such as 1, 2 and 3, being well known commercial articles, their construction and operation are well known to all acquainted with this art, and need no detail description.

The switches 1 and 2 are mounted in the same manner upon their respective switch carriers as shown in Figure 1, that is, both are open when tilted in the same direction. The mercury tube heat switch 3 is mounted upon a switch operating mechanism similar to the ignition switch 2 and is normally in closed position when switches 1 and 2 are in open position, as shown in Figure 1.

The switches 2 and 3 are both mounted upon their respective carriers in opposite directions, as shown in Figure 1, and are caused to operate simultaneously in unison by the link 28 pivotally connected to corresponding parts of the depending portions of the respective actuators 25. The lateral extension of the actuator 25 of the heat switch operating mechanism beyond its operating link 26 is provided with depending bracket 29 having two spaced apart outwardly extending studs 30—31 adjacent the lower end so arranged that when the switch 2 is in the off position the other switch 3 is in the on position and the bi-metallic strip 21 is cold, the studs will be below the end of the said strip but upon the strip being heated and thereby curved downward the end will pass between the studs and engage the lower stud 31 and upon continued downward travel will cause the bracket 29 to rotate the actuator 25 to throw the switch 3 to the off position and by link 28 also throw switch 2 to the on position. Upon the cessation of heat the bi-metallic strip 21 will straighten and as it cools causing its free end to move upward and engage stud 30 imparting an upward movement to the bracket 29 to throw both switches 3 and 2 simultaneously to the on and off positions respectively before the strip 21 completely straightens to the position shown in Figure 1.

Secured to the carrier 24 of switch 3 is an operating plate 32 of approximately triangular shape which extends upward and to the right thereof, the body of which is cut out to form an edge of irregular contour. Secured to the freely movable carrier 24' of the motor switch 1 is an actuator 33 having an angular extension toward the right which extension mounts a stud 34 adapted to engage at times the edge of the irregular opening of the operating plate 32 and the body of the actuator 33 above the carrier of switch 1 is provided with an outwardly extending stud or pin 35 adapted to pass through a slot in the end of a link 36 pivoted at its other end to a bracket 37 extending upward from the carrier of switch 2 and so arranged that when switches 1 and 2 are in the off position and switch 3 is in the on position, as shown in Figure 1, the pin 35 is engaged by the end of the slot adjacent switch 2, so that the actuator 33 of switch 1 may be rotated to the right independently of switches 2 and 3 but when pin 35 engages link 36, as shown in Figure 1, upon the simultaneous movement of the mechanism of switches 2 and 3 to the right or on position of switch 2 the actuator 33 of switch 1 is also simultaneously moved to the right throwing motor switch 1 to the on position.

A solenoid operated lever 38 having a core 39 attached upon one end is pivotally mounted on the base plate 22 of the mechanism of switch 3 and is provided with an obtuse angular extension beyond its pivot point. The core 39 is adapted to be drawn upward within solenoid 12 when energized, as shown in Figures 4 and 8, and thereby rotate the lever 38 causing the other end of the lever to move in the direction of the actuator 33 of the switch 1. The edge of the lever 38 adjacent the actuator 33 is provided with two spaced apart notches adapted to receive a pin 34' in prolongation of the stud 34 upon the opposite side the actuator 33, under certain conditions, namely, when the actuator 33 has been rotated to the right and the lever 38 rotated there-toward, by the core 39 being drawn upward within the solenoid, pin 34' will be received in the lower notch holding the motor switch 1 in on position and when the actuator 33 has been rotated to the left and the core 39 is fully drawn within the solenoid 12 the pin 34' will be received within the upper notch and hold the motor switch 1 in off position. The upper portion of this end of the lever 38 is provided with a slot through which projects a pin 40 extending from a latch plate 41 pivotally carried in said slot. The pin 40 projects over the irregular edge within the operating plate 32 of switch 3, which opening is of such shape when the switch 3 is in the on position as shown in Figure 1, to allow either plate 32 or lever 38 to be independently rotated about their respective pivots when the other is in the positions shown in Figure 1, without the pin 40 engaging the edge. That portion of the opening along what may be called the base of the approximate triangular operating plate most distant from its pivoted apex is provided with a spur 42 so formed that when the operating plate 32 has been rotated by the throwing of switch 3 to the off position and lever 38 is in the normal downward position with the core 39 in its lower position within the solenoid 12, as shown in Figure 2, the pin 40 is adapted to engage the spur 42 and lock the operating plate 32 and hold the heat switch 3 in the off position.

The latch plate 41 is free to move up and down with its pin 40 extending through the slot in the end of the lever 38 and also rotate upon said pin. In the position shown in Figure 1 the pin 40 rests in the bottom of the slot and the edge of the latch plate rests against a boss 42' of the pivot of lever 38. A latch actuating link 43 is pivoted at its lower end to the actuator 25 of the operating mechanism of switch 3 with its other end pivoted to a plate 44 also pivotally mounted on the pivot of lever 38 and having a stud 45 carried thereon, so that when the actuator 25 throws switch 3 to the off position the stud 45 will engage the under side of the latch plate 41 and move it upward to carry the latch pin 40 into engagement with the spur 42 of the opening in the operating plate 32, as shown in Figure 2, the latch pin 40 being carried out of engagement with the spur 42 upon the rotation of the lever 38 by the energizing of the solenoid 12, as shown in Figure 4.

The switches 1, 2 and 3 will be operated by the mechanism above described in the following manner: In the position shown in Figure 1, the motor switch 1 and the ignition switch 2 are both in the off position, the heat switch 3 is in the on position and the solenoid 12 is de-energized. This is the normal position of these parts when the oil burner system which this device is designed to control is idle, that is, is not called upon to produce heat. Omitting the wiring and electrical connections for the time being, a downward movement of the free end of the strip 21 initiates a movement to actuator 25 of the mechanism of switch 3 which is transmitted through link 28 to the actuator of switch 2 which movement continuing throws switches 2 and 3 simultaneously, switch 2 to the on position and switch 3 to the off position, at the same time the movement of switch 2 through link 36 and actuator 33 throws switch 1 to the on position, as shown in Figure 2. The solenoid 12 is not energized. The movement of switch 3 brings the operating plate 32 thereof into the position shown in Figure 2 and stud 45 has brought latch pin 40 above and into engagement with the spur 42 of the operating plate and the lower notch of lever 38 opposite the pin 34' of the actuator 33 of switch 1.

If the solenoid 12 is energized while the free end of strip 21 is depressed, as shown in Figure 2, the lever 38 will be rotated to carry pin 40 away from the spur 42 of the irregular edge freeing latch plate 41 and engage the lower notch of said lever with the pin 34' of the actuator 33 of the motor switch 1, whereby, upon an upward movement of the free end of strip 21, to its normal position of Figure 1, the switch 2 will be thrown by bracket 29 and link 28 to the opposite position, that is, to the off position, however, switch 1 will remain in the on position inasmuch as pin 34' and lever 38 are locked and the slot about pin 35 allows the link 36 to move independently of the actuator 33.

The locking of pin 34' in this position also locks the stud 34 in engagement with the edge of operating plate 32 which prevents the return of switch 3 to the on position. When this happens it is to be noted that the motor switch 1 is closed while the ignition and heat switches 2 and 3 are open. This position, as shown in Figure 4, is termed the running position, that is, the burner motor is in circuit and the burner will continue to operate as long as the parts remain in this position.

In the normal operation, the downward movement of the strip 21 brings the parts into the position shown in Figure 2. Should, in this position, the solenoid remain de-energized, then the normal upward movement of the strip 21 will throw switch 2 to the off position, the pin 40 having engaged spur 42 holds actuator plate 32 against rotation locking switch 3 in the off position, allows the roller of operating link 26 to ride upon the upper angular surface of carrier 24, as shown in Figure 6, and permits switch 1 to return to off position by its own weight aided by counterweight 1'. When this occurs all the switches are brought into off position. In this position the parts remain locked until manually released by a rotative movement being imparted to lever 38 which will free pin 40 and spur 42, allowing the parts to return to the first position shown in Figure 1.

For the same reason, with the parts in the running position shown in Figure 4, should the solenoid 12 be de-energized, the lever 38 will rotate to disengage the pin 34' and the motor switch 1 will by its own weight rotate to the off position. The movement of the motor switch 1 to the off position unlocks the operating plate 32 as the movement of actuator 33 moves pin 34 upward allowing the operating link roller to throw switch 3 to the on position and the parts assume the position shown in Figure 1.

Should the solenoid 12 be momentarily de-energized, that is, drop the core 39 and then draw it upward again immediately, the cause of which is a condition that will be later described in connection with the operation of an oil burner, the parts as soon as the core 39 rotates lever 38 sufficiently to release actuator 33 and operating plate 32 will assume the position shown in Figure 1, as just above described, and the energizing of the solenoid will cause the lever 38 to rotate and bring the upper notch in contact with pin 34' which will lock the parts in that position as shown in Figure 8, inasmuch as the body of link 36 at the end of the slot engages pin 35 of the locked actuator 33 and prevents switches 1 and 2 from being thrown to on position until the solenoid is de-energized to drop its core to cause lever 38 to unlock the actuator 33.

Having described the parts of the switch mechanism, and the movements of the parts from normal, or idle, position to running position, and the effect of energizing and de-energizing of the solenoid, the electric circuits in which the parts are connected will now be described.

Referring to Figure 1 and the wiring diagram forming a part thereof, a room thermostat is indicated by T, a boiler control by B, a burner motor by O, a spark or ignition coil by I, a spark gap by S and a switch responsive to combustion conditions by V. All these devices are of commercial form and by themselves form no part of this invention, so need be only briefly described. Electrically operated domestic liquid fuel, or oil, burners are customarily controlled by a room thermostat located at a place most advantageous to maintain an even temperature in the building, also the heater or boiler is usually provided with a safety control, in series with the room thermostat, adapted to discontinue the operation of the burner when temperature or pressure conditions within the heater or boiler approach the danger limit. The room thermostat T and control B are commercial articles designed for the above purpose. O is the motor for operating the burner. I is the ignition coil or transformer and S the spark gap both of which are of well known construction and operation. V is a switch responsive to combustion conditions and is shown here as a commercial device and operated by the light from the burner flame to close a circuit therethrough and is more particularly described in the applicant's pending application Serial No. 153,022 filed December 6, 1926.

The diagram shows the incoming current from the commercial source passing through the wire H to binding post 7 and from there through wires T and T' through the control B and thermostat T to binding post 6. Binding post 6 is connected through lead 18 to the heat switch 3, shown in Figure 1 as closed, through which the current passes by the way of lead 17 to binding post 10 connected to the coil of heat producing resistance wire 19 arranged about the bi-metallic strip 21, the other end of which is connected to binding post 11 which in turn is connected by lead 20 to binding post 9 which binding post is connected by wire R to the commercial circuit return.

When the room thermostat calls for heat this circuit will be closed through thermostat T causing the heat coil 19 to deform the bi-metallic strip 21 to operate through bracket 29 the actuator 25 and throw switches 1, 2 and 3 to the position shown in Figure 2 whereby the heat switch 3 is opened and the ignition and motor switches 2 and 1 are closed. The current then can pass from binding post 7 through lead 14 to the motor switch 1 and by way of lead 13 to binding post 5 and from there through leads M and M' through the burner motor O to binding post 9 and from there back to the commercial line by wire R. The ignition and motor circuits thereby being closed the spark will jump across the spark gap S and the motor will deliver fuel to the burner nozzle. This circuit is shown in the wiring diagram shown in Figure 3. It is to be noted that the current through the heat switch has caused the bi-metallic strip 21 to move slowly downward and as it approached the lower limit of its travel the heat switch was thrown to open or off position.

Should the burner flame fail to ignite the strip 21 will cool and the free end ascend to its original position returning the motor switch 1 and ignition switch 2 to the off positions and at the same time lock through pin 40 engaging spur 42 the heat switch in the off position, as shown in Figure 6, whereby the burner ceases to operate. This circuit is illustrated in Figure 7.

Should the burner flame ignite before the strip 21 returns to its normal position the switch V responsive to combustion conditions closes the circuit therethrough and maintains the circuit through the motor switch 1 as long as the circuit through V remains closed by energizing the solenoid 12, in the following manner. The closing of the circuit through V closes the circuit through wires V¹ and V² from binding post 6 to binding post 8 and from thence through leads 8' and 12' through the solenoid 12 to binding post 9 and by way of wire R to the return of the commercial line. The energizing of the solenoid 12 draws the core 39 upward thereby rotating lever 38 to the position shown in Figure 4 whereby the motor switch 1 is locked in on position and the switches 2 and 3 are in the off position. This is called the running position and is shown in the wire diagram of Figure 5.

Where the room temperature causes the room thermostat to open the circuit therethrough the circuit is also opened through the switch V which is in series with the thermostat T, as shown in all the wiring diagrams, and the solenoid will be de-energized dropping core 39, whereupon motor switch 1 will be released and return to off position and the parts will return to the position shown in Figure 1, ready to start the burner mechanism again when the room thermostat calls for heat.

By the operation as described so far, it is seen that the operation of the burner is normally controlled to start and stop by the room thermostat and if the burner flame fails to initially ignite the burner mechanism is stopped and locked in inoperative position requiring a manual release before it can again operate. Such a failure is usually caused by a lack of oil or a stoppage of the discharge opening of the burner nozzle and is a serious condition that should be remedied before the burner can again operate and therefore the manual reset is desirable for the safety of the dwelling. However, there are other occurrences that may cause the burner to cease operating which when removed will allow the burner to normally resume operation if the parts are not locked in the off position, such as any interruption of the commercial current, manually opening and quickly closing the room thermostat circuit while the burner is operating, or other similar causes, and sometimes by a fluctuation of the burner flame itself which would break the circuit through the switch V.

This device provides means so that the normal operation of the burner may be continued without a manual resetting; first, in case there is a cessation of current and a resumption of the current before the switch V opens; second, when a cessation of current and the switch V opens before there is a resumption of the current; and, third, when the switch V opens due to flame fluctuation during the normal operation of the burner.

In the first case, when the current fails the solenoid 12 is deenergized and the parts return to the normal starting position and then should the current resume before the switch V opens, the solenoid 12 is immediately reenergized locking the motor switch in normal open position, as shown in Figure 8, whereupon the flame becomes extinguished and the switch deenergizing the solenoid 12, opens whereupon all of the parts being in normal starting position but with the room thermostat closed a normal start of the operation is accomplished. This may be called a recycle of the normal operation and usually consumes enough time to allow any oil vapors that may have collected in the combustion chamber to become dissipated, and the motor switch is locked in the open position on from the time the current resumes until the switch V opens.

In the second case, when the current fails the solenoid 12 is immediately deenergized allowing the parts to return to the normal starting position and the switch V opens, just the same as if the room thermostat had opened, then the current resuming accomplishes a normal start, just as though the room thermostat had just closed.

In the third case, as soon as switch V opens the solenoid 12 is immediately deenergized and the parts return to the normal idle or starting position, but the immediate closing thereafter of the switch V energizes the solenoid 12 which locks the motor switch in the normal open position whereupon the flame is extinguished and the switch V opens deenergizing solenoid 12 and all the parts assume the normal starting position and a recycling action takes place, as above described.

As far as is generally known the commercial electrically operated domestic liquid fuel burner systems require an additional control for the fuel supply separate and distinct from the operating control and certain types employ a domestic gas ignition, whereby the electric spark ignites the gas and the gas flame ignites the liquid fuel which also requires a separate and distinct gas control in addition to the fuel and operating controls.

This invention also contemplates the incorporating of mechanism to control such fuel and gas supply which mechanism is actuated by the operation of the control device for operating the burner as above described.

To control the fuel supply a fuel valve casing 50 is supported upon the panel of the switch mechanism. The valve is preferably of the rotating type, as shown in Figures 10, 11 and 12, having a rotating valve operating stem 51 projecting from the side of the casing having an upwardly extending fixed operating lever 52 adapted to be connected by a pivoted operating link 53 to the actuator 33 of the motor switch 1 and so arranged that when the motor switch is open the fuel valve is closed and when the motor switch is closed the fuel valve is open.

In the type of valve disclosed the casing 50 is preferably in the form of a block having vertical separated chambers 54 and 55, each adapted to be connected in the oil line, that is, one chamber connecting to the source of supply and the other to the burner pump or nozzle. The valve stem 51 is mounted in a bearing to extend in a horizontal direction between the chambers 54 and 55 and carry a circular valve plate 56 on the outer end adapted to rotate with the stem and form a fuel tight seal with the outer surface of the casing over which it rotates. The chamber 54 connected with the source of supply is provided with horizontal passageways 57. The body of the outer face of the casing is cut away leaving a space 58 between the face of the casing and plate 56, as shown in Figure 11, and the horizontal passageways 57 from the supply chamber 54 open into this space 58. The plate 56 is held against the bearing surface of the casing by a spaced apart disc spring 60 held in engagement by a cap 61 screwed over the end of the casing which cap is of greater inner diameter than the plate 56. The plate 56 is provided with ports 62 which when registering with the ducts 59 leading into chamber 55 will afford communication from the supply chamber 54 through passageways 57 to the space about the plate 56 within the cap and space 58 and through ports 62 and ducts 59 to the discharge chamber 55.

The relation of the ports 62 and operating lever 52 is such that when the motor switch 1 is in the off position the plate 56 will close the openings of ducts 59 and when the motor switch is rotated to the on position its movement will be imparted through actuator 33, link 53, and operating lever 52 to rotate the valve stem 51 to cause the ports 62 to register with the intake ducts 59, whereby fuel will be supplied to the burner mechanism whenever the motor is in operation and immediately cut off as soon as the motor circuit is broken.

To control the supply of gas when gas ignition is used, a gas valve 63 is provided and interposed in the gas pipe line 64 between the source of supply and the discharge adjacent the burner nozzle. The valve 63 is preferably mounted upon the switch panel above the ignition switch 2 and includes two vertical separated chambers 65 and 66 connected to each other by a horizontal port 67 and each chamber connected at one side to the pipe line 64. A valve head 68 carried on a horizontal stem 69 reciprocating in a cap 70 of the valve casing is adapted to control the opening of the port 67. The outer extremity of the reciprocatable stem 69 is adjustably engaged to an operating arm 71 rigidly mounted upon the carrier 24 of the switch 2, and so adjusted that when the switch 2 or ignition switch, is in the open or off position the head 68 will close the port 67 and no gas will pass to the burner nozzle and when the ignition switch 2 is closed or in the on position the electrical ignition device will be placed in operation and the movement of switch 2 will open the port 67 whereupon gas from the independent source will flow to the burner nozzle, be ignited by the electrical ignition device and the flame therefrom will ignite the liquid fuel and as soon as the operation of the device throws the ignition switch to off position the gas valve will be simultaneously closed.

What I claim is:

1. In a control for an electrically-operated liquid fuel heating system including a fuel feeding motor, a control switch and a normally open safety switch responsive to combustion conditions, the combination with a normally open motor circuit switch and a normally closed actuating circuit switch, of a switch operating mechanism including a solenoid in circuit with the safety switch, means actuated upon closing of the control switch to operate the switch mechanism to close the motor switch and open the actuating switch, said mechanism co-operating with the solenoid, upon establishment of combustion, to lock the motor switch closed and the actuating switch open; co-operating with the solenoid, upon initial failure of combustion, to lock the actuating switch in open position and permit the mechanism to return the motor switch to open position and then leave the motor switch open until the actuating switch is manually released; co-operating with the solenoid, upon failure of combustion after it has been established, to permit the motor switch to open and close the actuating switch; and co-operating with the solenoid, upon momentary cessation of electric current after combustion has been established and upon current resumption before the safety switch has normally opened, to permit the motor switch to open, the actuating switch to close and thereafter lock the motor switch open until the safety switch normally opens, whereupon the motor switch is released and the switch operating mechanism is permitted to automatically repeat the cycle of operation first set forth.

2. In a device of the character described, a normally open motor switch, a normally closed actuating switch, switch operating mechanism for said switches, means actuated upon closing the circuit through the actuating switch to operate the switch mechanism to close the motor switch and thereafter to open the actuating switch independently of the motor switch, a solenoid in circuit with a normally open safety switch responsive to combustion conditions for controlling mechanism normally adapted to be engaged by the actuating switch operating mechanism when the actuating switch is thrown to open position and lock the actuating switch independently of the other switch until manually released and upon energization of the solenoid by the closing of the safety switch, upon establishment of combustion, to actuate said solenoid controlled mechanism to lock the motor switch in closed position and the actuating switch in open position and thereafter, upon a cessation of electric current, to release the motor switch and actuating switch operating mechanism to permit the moving of the motor switch to open position and throwing the actuating switch to closed position and upon resumption of the current, before the safety switch has normally opened, to lock the motor switch in open position independently of the other switch until the safety switch opens and thereafter permit the device to automatically repeat the cycle of operation first set forth and, upon deenergizing of the solenoid by failure of combustion after it has been established, to actuate said solenoid controlled mechanism to permit the motor switch to open and the actuating switch to close.

3. In a control for an electrically-operated liquid fuel heating system including a fuel feeding motor, a control switch and a safety switch responsive to combustion conditions, the combination with a motor circuit switch, and an actuating circuit heat switch, said safety and heat switches in circuit with the control switch, of a switch operating mechanism including a solenoid in circuit with a safety switch, a temperature actuated mechanism with a heating element in the circuit of the heat switch, mechanical switch-throwing means actuated by the operation of the temperature actuated mechanism, and switch locking means actuated by the energization of the solenoid, all mounted upon a panel with the heat switch normally closed, the motor switch normally open and the solenoid in series with the normally open safety switch, said switches so connected that upon closing of the circuit through the control switch, the heating element is energized to operate the temperature actuated mechanism to actuate the switch mechanism to close the motor switch and open the heat switch, whereupon if combustion is initiated, the solenoid is energized to actuate its mechanism to lock the motor switch closed and actuating switch open, and, if initial combustion fails, the failure of the solenoid to be energized causes the solenoid-actuated mechanism to lock the heat switch in the open position and to permit the motor switch to open thereby preventing operation until the heat switch is manually released, and, if combustion fails after it has been established, the solenoid is deenergized whereupon the solenoid actuated mechanism permits the motor switch to open and the actuating switch to close.

4. In a control for an electrically-operated liquid fuel heating system including a fuel feeding motor, a control switch, an electrical ignition device, and a normally open safety switch responsive to combustion conditions, the combination with a normally open motor circuit switch, a normally open ignition circuit switch, and a normally closed actuating circuit switch, of a switch operating mechanism including a solenoid in circuit with the safety switch, means actuated upon closing of the control switch to operate the switch mechanism to close the motor switch, close the ignition switch of said mechanism, and open the actuating switch and thereafter open the ignition switch co-operating with the solenoid, upon establishment of combustion, to lock the motor switch closed and the actuating switch open; co-operating with the solenoid, upon initial failure of combustion, to lock the actuating switch in open position and permit the mechanism to return the ignition and motor switches to open position and then leave the motor switch open until the actuating switch is manually released; co-operating with the solenoid, upon failure of combustion after it has been established, to permit the motor switch to open and the actuating switch to close, and co-operating with the solenoid, upon momentary cessation of electric current after combustion has been established and upon current resumption before the safety switch has normally opened, to permit the motor switch to open, the actuating switch to close and thereafter lock the motor switch open until the safety switch normally opens whereupon the motor switch is released and the switch operating mechanism is permitted to automatically repeat the cycle of operation first set forth.

5. In a device of the character described, a normally open motor switch, a normally open ignition switch, a normally closed actuating switch, switch operating mechanism for said switches, means actuated upon closing the circuit through the actuating switch to operate the switch mechanism to simultaneously close the ignition switch, close the motor switch, open the actuating switch and then open the ignition switch independently of the motor switch, a solenoid in circuit with a normally open safety switch responsive to combustion conditions for controlling mechanism normally adapted to be engaged by the actuating switch operating mechanism when the actuating switch is thrown to open position and lock the actuating switch independently of the other two switches until manually released and upon energization of the solenoid by the closing of the safety switch, upon establishment of combustion, to actuate said solenoid controlled mechanism to lock the motor switch in closed position and the actuating switch in open position independently of the ignition switch and thereafter, upon a cessation of electric current, to release the motor switch and actuating switch operating mechanism to permit the moving of the motor switch to open position and throwing the actuating switch to closed position and upon resumption of the current, before the safety switch has normally opened, to lock the motor and ignition switches in open position independently of the actuating switch until the safety switch opens and thereafter permit the device to automatically repeat the cycle of operation first set forth, and, upon deenergizing of the solenoid by failure of combustion after it has been established, to actuate said solenoid controlled mechanism to permit the motor switch to open and the actuating switch to close.

6. In a control for an electrically-operated liquid fuel heating system including a fuel feeding motor, control switch, an electrical ignition device, and a safety switch responsive to combustion conditions, the combination with a motor circuit switch, an ignition circuit switch, and an actuating circuit heat switch, said safety and heat switches in circuit with the control switch, of a switch operating mechanism including a solenoid in circuit with the safety switch, a temperature actuated mechanism with a heating element in the circuit of the heat switch, and mechanical switch-throwing means operated by the actuation of the temperature actuated mechanism, switch locking means actuated by the energization of the solenoid, all mounted upon a panel with the heat switch normally closed, the motor and ignition switches normally open and the solenoid in series with the normally open safety switch, said switches so connected that upon closing of the circuit through the control switch, the heating element is energized to operate the temperature actuated mechanism to actuate the switch mechanism to close the motor and ignition switches and open the heat switch and thereafter actuate the mechanism to open the ignition switch, whereupon, if combustion is initiated, the solenoid is energized to actuate its mechanism to lock the motor switch closed, and if initial combustion fails, the failure of the solenoid to be energized causes the solenoid-actuated mechanism to lock the heat switch in the open position and to permit the motor switch to open thereby preventing operation until the heat switch is manually released, and, if combusion fails after it has been established, the solenoid is deenergized whereupon the solenoid actuated mechanism permits the motor switch to open and the actuating switch to close.

7. In a control for an electrically-operated liquid fuel heating system including a fuel feeding motor, control switch, and a normally open safety switch responsive to combusition conditions, the combination with a normally open motor circuit switch, a normally inactive ignition device, and a normally closed actuating circuit switch, of a switch operating mechanism including a solenoid in circuit with the safety switch, and including means actuated upon closing of the control switch to operate the switch mechanism to simultaneously close the motor switch and operate the ignition device and open the actuating switch and thereafter render the ignition device inactive, said mechanism cooperating with the solenoid upon establishment of combustion to lock the motor switch closed and the actuating switch open; co-operating with the solenoid, upon failure of combustion after it has been established, to permit the motor switch to open and the actuating switch to close; and co-operating with the solenoid, upon failure of initial combustion to lock the actuating switch in open position and permit the mechanism to render the ignition device inoperative and the motor switch to open and then leave the motor switch open until the actuating switch is manually released, and upon momentary cessation of electric current, after combustion has been established and upon current resumption before the safety switch has normally opened, to permit the motor switch to open, the actuating switch to close and thereafter lock the motor switch open until the safety switch normally opens whereupon the motor switch is released and the switch operating mechanism is permitted to automatically repeat the cycle of operation first set forth.

8. In a device of the character described, a normally open motor switch, a normally inactive ignition device, a normally closed actuating switch, operating mechanism for said switch and device, means actuated upon closing the circuit through the actuating switch to operate the switch mechanism to simultaneously close the motor switch and operate the ignition device and open the actuating switch and thereafter render the ignition device inactive independently of the motor switch, a solenoid in circuit with a normally open safety switch responsive to combustion conditions for controlling mechanism normally adapted to be engaged by the actuating switch operating mechanism when the actuating switch is thrown to open position and lock the actuating switch independently of the other switch until manually released, and upon energization of the solenoid by the closing of the safety switch upon establishment of combustion to actuate said solenoid controlled mechanism to lock the motor switch in closed position and the actuating switch in open position and thereafter upon a cessation of electric current, to release the motor switch and actuating switch operating mechanism to permit the moving of the motor switch to open position and throwing the actuating switch to closed position and upon resumption of the current, before the safety switch has normally opened, to independently lock the motor switch in open position until the safety switch opens and thereafter permit the device to automatically repeat the cycle of operation first set forth, and, upon deenergizing of the solenoid by failure of combustion after it has been established, to actuate said solenoid controlled mechanism to permit the motor switch to open and the actuating switch to close.

9. In a control for an electrically-operated liquid fuel heating system including a fuel feeding motor, a control switch, an ignition device, and a safety switch responsive to combustion conditions, the combination with a motor circuit switch, means for operating the ignition device, and an actuating circuit heat switch, of a switch operating mechanism including a solenoid in circuit with the safety switch, a temperature actuated mechanism with a heating element in the circuit of the heat switch, mechanical switch-throwing means actuated by the operation of the temperature actuated mechanism, and switch locking means actuated by the energization of the solenoid, all mounted upon a panel with the heat switch normally closed, the motor switch normally open, the ignition device normally inactive, and the solenoid in series with the normally open safety switch, said switches so connected that upon closing of the circuit through the control switch, the heating element is energized to actuate the temperature actuated mechanism to actuate the switch mechanism to close the motor switch, render the ignition device operative, open the heat switch, and thereafter actuate the mechanism to render the ignition device inactive, whereupon, if combustion is initiated, the solenoid is energized to actuate its mechanism to lock the motor switch closed, and, if initial combustion fails, the failure of the solenoid to be energized causes the solenoid-actuated mechanism to lock the heat switch in the open position and to permit the motor switch to open thereby preventing operation until the heat switch is manually released, and, if combustion fails after it has been established, the solenoid is deenergized whereupon the solenoid actuated mechanism permits the motor switch to open and the actuating switch to close.

10. In a control for an electrically-operated liquid fuel heating system including a fuel feeding apparatus, a motor for operating same, a fuel line to the feeding apparatus, a control switch, and a normally open safety switch responsive to combustion conditions, the combination with a normally open motor circuit switch, a normally closed actuating circuit switch, of means for opening and closing the fuel valve as the motor switch closes and opens, a switch operating mechanism including a solenoid in circuit with the safety switch, means actuated upon closing of the control circuit to operate the switch mechanism to close the motor switch, open the fuel valve and open the actuating switch, said mechanism co-operating with the solenoid, upon establishment of combustion, to lock the motor switch closed fuel valve open, and the actuating switch open; co-operating with the solenoid, upon failure of combustion after it has been established, to permit the motor switch to open and the actuating switch to close and co-operating with the solenoid, upon initial failure of combustion to lock the actuating switch in open position and permit the mechanism to return the motor switch to open position, close the fuel valve and then leave the motor switch open until the actuating switch is manually released; and co-operating with the solenoid, upon momentary cessation of electric current after combustion has been established and upon current resumption before the safety switch has normally opened to permit the motor switch, to open and the fuel valve to close, the actuating switch to close and thereafter lock the motor switch open and fuel valve closed until the safety switch normally opens, whereupon the motor switch is released and the switch operating mechanism is permitted to automatically repeat the cycle of operation first set forth.

11. In a device of the character described, a fuel line, a normally open motor switch, a normally closed actuating switch, a control switch, a normally closed fuel valve in the fuel line, switch operating mechanism for said actuating switch, means actuated upon closing the circuit through the actuating switch to operate the switch mechanism to simultaneously close the motor switch, open the fuel valve, and to open the actuating switch independently of the motor switch, a solenoid in circuit with a normally open safety switch responsive to combustion conditions for controlling mechanism normally adapted to be engaged by the actuating switch operating mechanism when the actuating switch is thrown to open position and lock the actuating switch independently of the other switch until manually released, and upon energization of the solenoid by the closing of the safety switch upon establishment of combustion to actuate said solenoid controlled mechanism to lock the motor switch in closed position, the fuel valve in open position and the actuating switch in open position and, thereafter, upon a cessation of electric current to release the motor switch and fuel valve and actuating switch operating mechanism to permit the moving of the motor switch to open position and fuel valve to closed position and, the throwing of the actuating switch to closed position and, upon resumption of the current, before the safety switch has normally opened, to lock the motor switch in open position independently of the other switch until the safety switch opens and, thereafter, permit the device to automatically repeat the cycle of operation first set forth, and, upon deenergizing of the solenoid by failure of combustion, after it has been established to actuate said solenoid controlled mechanism to permit the motor switch to open and the actuating switch to close.

12. In a control for an electrically-operated liquid fuel heating system including a fuel feeding apparatus, a motor for operating same, a fuel line to the feeding apparatus, a control switch, and a safety switch responsive to combustion conditions, the combination with a motor circuit switch, a fuel valve in the fuel line, means connecting the motor switch to close the fuel valve when the motor switch opens and open the valve as the switch closes, and an actuating circuit heat switch, of a switch operating mechanism including a solenoid in circuit with the safety switch, a temperature actuated mechanism with a heating element in the circuit of the heat switch and mechanical switch-throwing means actuated by the operation of the temperature actuated mechanism, and switch locking means actuated by the energization of the solenoid, all mounted upon a panel with the heat switch normally closed, the motor switch normally open and the solenoid in series with the normally open safety switch, said switches so connected that upon closing of the circuit through the control switch, the heating element is energized to operate the temperature actuated mechanism to actuate the switch mechanism to close the motor switch and open the heat switch, whereupon, if combustion is initiated the solenoid is energized to actuate its mechanism to lock the motor switch closed, and the heat switch open and, if initial combustion fails, the failure of the solenoid to be energized causes the solenoid-actuated mechanism to lock the heat switch in the open position and to permit the motor switch to open thereby preventing operation until the heat switch is manually released and, if combustion fails after it has been established, the solenoid is denergized, whereupon the solenoid actuated mechanism permits the motor switch to open and the actuating switch to close.

13. In a control for an electrically-operated liquid fuel heating system including a fuel feeding apparatus, a motor for operating same, a fuel line to the feeding apparatus, a control switch, an electrical ignition device a normally open safety switch responsive to combustion conditions, and a normally closed fuel valve in the fuel line, the combination with a normally open motor circuit switch, a normally open ignition circuit switch, and a normally closed actuating circuit switch, of a switch operating mechanism including a solenoid in circuit with the safety switch, and means for simultaneously operating the fuel valve with the motor switch, means actuated upon closing of the control switch to operate the switch mechanism to close the motor and ignition switches and open the fuel valve and open the actuating switch and thereafter open the ignition switch, co-operating with the solenoid, upon establishment of combustion to lock the motor switch closed, the fuel valve open and the actuating switch open; co-operating with the solenoid, upon initial failure of combustion, to lock the actuating switch in open position and permit the mechanism to return the ignition and motor switches to open position and fuel valve to closed position and then leave the motor switch open and fuel valve closed until the actuating switch is manually released; co-operating with the solenoid, upon failure of combustion after it has been established, to permit the motor switch to open and the actuating switch to close, and co-operating with the solenoid, and upon momentary cessation of electric current after combustion has been established and upon current resumption before the safety switch has normally opened to permit the motor switch to open, the actuating switch to close and thereafter lock the motor switch open until the safety switch normally opens whereupon the motor switch is released and the switch operating mechanism is permitted to automatically repeat the cycle of operation first set forth.

14. In a device of the character described, a fuel line, a normally open motor switch, a normally open ignition switch, a normally closed actuating switch, a normally closed fuel valve in the fuel line, switch operating mechanism for said switches, means causing the fuel valve to operate simultaneously with the motor switch, means actuated upon closing the circuit through the actuating switch to operate the switch mechanism to simultaneously close the ignition and motor switches and open the fuel valve and to open the actuating switch and thereafter open the ignition switch independently of the motor switch, a solenoid in circuit with a normally open safety switch responsive to combustion conditions for controlling mechanism normally adapted to be engaged by the actuating switch operating mechanism when the actuating switch is thrown to open position and lock the actuating switch independently of the other two switches until manually released, and upon energization of the solenoid by the closing of the safety switch, upon establishment of combustion, to actuate said solenoid controlled mechanism to lock the motor switch in closed position, the fuel valve in open position and the actuating switch in open position independently of the ignition switch, and thereafter, upon a cessation of electric current through the safety switch, to release the motor switch to open position and the actuating switch to closed position and upon resumption of the current, before the safety switch has normally opened, to lock the motor switch in open position and the fuel valve in closed position independently of the switch until the safety switch opens and thereafter permit the device to automatically repeat the cycle of operation first set forth, and, upon deenergizing of the solenoid by failure of combustion, after it has been established to actuate said solenoid controlled mechanism to permit the motor switch to open and the actuating switch to close.

15. In a control for an electrically-operated liquid fuel heating system including a fuel feeding apparatus, a motor for operating same, a fuel line to the feeding apparatus, a fuel valve therein, a control switch, an electrical ignition device, and a safety switch responsive to combustion conditions, the combination with a motor circuit switch, means for operating the fuel valve simultaneously with the motor switch, an ignition circuit switch, and an actuating circuit heat switch, of a switch operating mechanism including a solenoid in circuit with the safety switch, a temperature actuated mechanism with a heating element in the circuit of the heat switch and mechanical switch-throwing means actuated by the operation of the temperature actuated mechanism, and switch locking means actuated by the energization of the solenoid, all mounted upon a panel with the heat switch normally closed, the motor and ignition switches normally open and the solenoid in series with the normally open safety switch; said switches so connected that upon closing of the circuit through the control switch, the heating element is energized to operate the temperature actuated mechanism to actuate the switch mechanism to close the motor and ignition switches, open the fuel valve and open the heat switch and thereafter actuate the mechanism to open the ignition switch, whereupon, if combustion is initiated, the solenoid is energized to actuate its mechanism to lock the motor switch closed, the fuel valve open, and actuating switch open, and, if initial combustion failed, the failure of the solenoid to be energized causes the solenoid-actuated mechanism to lock the heat switch in the open position and to permit the motor switch to open and the fuel valve to close thereby preventing operation until the heat switch is manually released, and, if combustion fails after it has been established, the solenoid is deenergized, whereupon the solenoid actuated mechanism permits the motor switch to open and the actuating switch to close.

16. In a control for an electrically-operated liquid fuel heating system including a fuel feeding apparatus, a motor for operating same, a fuel line to the feeding apparatus, a control switch, an ignition device, and a normally open safety switch responsive to combustion conditions, the combination with a normally open motor circuit switch, a normally closed fuel valve in the fuel line, means causing the fuel valve to operate simultaneously with the motor switch, said ignition device normally inactive and a normally closed actuating circuit switch, of a switch operating mechanism including a solenoid in circuit wth the safety switch, means actuated upon closing of the control switch to operate the switch mechanism to close the motor switch, open the fuel valve, operate the ignition device and open the actuating switch and thereafter render the ignition device inactive; said mechanism co-operating with the solenoid, upon establishment of combustion, to lock the motor switch closed, oil valve open and the actuating switch open; co-operating with the solenoid, upon initial failure of combustion, to lock the actuating switch in open position and permit the the mechanism to render the ignition device inactive and to return the motor switch to open position, the fuel valve to closed position and then leave the motor switch open and fuel valve closed until the actuating switch is manually released; co-operating with the solenoid, upon failure of combustion after it has been established, to permit the motor switch to open and the actuating switch to close, and co-operating with the solenoid, upon momentary cessation of electric current after combustion has been established and upon current resumption before the safety switch has normally opened, to permit the motor switch to open, the fuel valve to close, the actuating switch to close and thereafter lock the motor switch open, and fuel valve closed until the safety switch normally opens, whereupon the motor switch and fuel valve are released and the switch operating mechanism is permitted to automatically repeat the cycle of operation first set forth.

17. In a device of the character described, a fuel line, a normally open motor switch, an ignition device normally inactive, a normally closed actuating switch, a normally closed fuel valve in the fuel line, means for operating the fuel valve simultaneously with the motor switch, operating mechanism for said actuating switch and device, means actuated upon closing the circuit through the actuating switch to operate the switch mechanism to simultaneously close the motor switch, open the fuel valve, operate the ignition device, open the actuating switch and thereafter render the ignition device inactive independently of the motor switch, a solenoid in circuit with a normally open safety switch responsive to combustion conditions for controlling mechanism normally adapted to be engaged by the actuating switch operating mechanism when the actuating switch is thrown to open position and independently lock the actuating switch until manually released, and upon energization of the solenoid by the closing of the safety switch, upon establishment of combustion, to actuate said solenoid controlling mechanism to lock the motor switch in closed position, fuel valve in open position and the actuating switch in open position and thereafter, upon a cessation of electric current through the safety switch, to release the motor switch, fuel valve and actuating switch operating mechanism to permit the moving of the motor switch to open position and fuel valve to closed position and throwing the actuating switch to closed position and, upon resumption of the current, before the safety switch has normally opened, to independently lock the motor switch in open position and fuel valve in closed position until the safety switch opens and thereafter permit the device to automatically repeat the cycle of operation first set forth and, upon deenergizing of the solenoid by failure of combustion, after it has been established, to actuate said solenoid controlled mechanism to permit the motor switch to open and the actuating switch to close.

18. In a control for an electrically-operated liquid fuel heating system including a fuel feeding apparatus, a motor for operating same, a fuel line to the feeding apparatus, a control switch, an ignition device, and a safety switch responsive to combustion conditions, the combination with a motor circuit switch, a fuel valve in the fuel line, means for operating the fuel valve simultaneously with the motor switch, means for operating the ignition device, and actuating circuit heat switch, of a switch operating mechanism including a solenoid in circuit with the safety switch, a temperature actuated mechanism with a heating element in the circuit of the heat switch and mechanical switch-throwing means actuated by the operation of the temperature actuated mechanism, and switch locking means actuated by the energization of the solenoid, all mounted upon a panel with the heat switch normally closed, the motor switch normally open, the fuel valve normally closed, the ignition device normally inactive and the solenoid in series with the normally open safety switch, said switches so connected that upon closing of the circuit through the control switch, the heating element is energized to operate the temperature actuated mechanism to actuate the switch mechanism to close the motor switch, open the fuel valve, render the ignition device operative, and open the heat switch and a predetermined time thereafter actuate the switch operating mechanism to render the ignition device inactive; and if in the meantime the combustion is initiated, the solenoid is energized to actuate its mechanism to lock the motor switch closed and the fuel valve open and the actuating switch open and, if initial combustion fails, the failure of the solenoid to be energized causes the solenoid-actuated mechanism to lock the heat switch in the open position and to permit the motor switch to open and the fuel valve to close thereby preventing operation until the heat switch is manually released, and, if combustion fails after it has been established, the solenoid is deenergized, whereupon the solenoid actuated mechanism permits the motor switch to open and the actuating switch to close.

IRA E. McCABE.